United States Patent
Kanai et al.

(10) Patent No.: US 12,240,490 B2
(45) Date of Patent: Mar. 4, 2025

(54) VEHICLE MANAGEMENT SYSTEM

(71) Applicant: Hitachi Construction Machinery Co., Ltd., Tokyo (JP)

(72) Inventors: Masaki Kanai, Tokyo (JP); Katsuaki Tanaka, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 202 days.

(21) Appl. No.: 18/024,412

(22) PCT Filed: Feb. 16, 2022

(86) PCT No.: PCT/JP2022/006238
§ 371 (c)(1),
(2) Date: Mar. 2, 2023

(87) PCT Pub. No.: WO2022/201989
PCT Pub. Date: Sep. 29, 2022

(65) Prior Publication Data
US 2023/0311937 A1    Oct. 5, 2023

(30) Foreign Application Priority Data
Mar. 26, 2021   (JP) ................. 2021-052953

(51) Int. Cl.
*B60W 60/00*   (2020.01)
*G07C 5/00*    (2006.01)

(52) U.S. Cl.
CPC ........... *B60W 60/001* (2020.02); *G07C 5/006* (2013.01); *B60W 2554/4041* (2020.02)

(58) Field of Classification Search
CPC .............................. B60W 60/001; G07C 5/006
See application file for complete search history.

(56) References Cited

U.S. PATENT DOCUMENTS 9,595,196 B1    3/2017   Hiranaka
10,216,196 B2 *  2/2019   Harvey ................ G05D 1/0295
(Continued)

FOREIGN PATENT DOCUMENTS

JP   2000-339029 A   12/2000
JP   2020-155014 A    9/2020
(Continued)

OTHER PUBLICATIONS

International Preliminary Report on Patentability (PCT/IB/338 & PCT/IB/373) issued in PCT Application No. PCT/JP2022/006238 dated Oct. 5, 2023, including English translation of document C2 (Japanese-language Written Opinion (PCT/ISA/237), filed on Mar. 2, 2023) (5 pages).
(Continued)

*Primary Examiner* — Seth A Silverman
(74) *Attorney, Agent, or Firm* — Crowell & Moring LLP

(57) ABSTRACT

Provided is a vehicle management system capable of securing safety of an escorted vehicle while suppressing a decrease in productivity by improving setting of an entry prohibited area of an unmanned vehicle at the time when an abnormal state of position information on the escorted vehicle has been detected. The vehicle management system is configured such that an unmanned vehicle, an escorted vehicle, an escorting vehicle, and a control station that controls the unmanned vehicle on the basis of position information on the escorting vehicle and position information on the escorted vehicle are capable of communicating with each other. A controller of the control station computes, when an abnormal state of the position information on the escorted vehicle has been detected, an inter-vehicle distance between the escorting vehicle and the escorted vehicle before the detection of the abnormal state, to thereby set an entry prohibited area of the unmanned vehicle on the basis (Continued)

of the current position information on the escorting vehicle and the inter-vehicle distance. An output device of the escorting vehicle outputs an alarm that prompts maintenance of the inter-vehicle distance when the abnormal state of the position information on the escorted vehicle has been detected.

4 Claims, 10 Drawing Sheets

(56) References Cited

U.S. PATENT DOCUMENTS

| | | | |
|---|---|---|---|
| 2001/0044697 A1* | 11/2001 | Kageyama | G08G 1/207 |
| | | | 701/482 |
| 2017/0145663 A1 | 5/2017 | Hiranaka | |
| 2021/0395978 A1 | 12/2021 | Takaoka | |

FOREIGN PATENT DOCUMENTS

| | | |
|---|---|---|
| JP | 2020-197885 A | 12/2020 |
| WO | WO 2016/039489 A1 | 3/2016 |
| WO | WO 2016/056677 A1 | 4/2016 |

OTHER PUBLICATIONS

International Search Report (PCT/ISA/210) issued in PCT Application No. PCT/JP2022/006238 dated Apr. 12, 2022 with English translation (five (5) pages).
Japanese-language Written Opinion (PCT/ISA/237) issued in PCT Application No. PCT/JP2022/006238 dated Apr. 12, 2022 (three (3) pages).

* cited by examiner

FIG. 3

| VEHICLE ID | PATH |
|---|---|
| vehicle_1 | node_DP0~node_LP0 |
| vehicle_2 | node_DP0~node_LP0 |
| ... | ... |
| ... | ... |
| ... | ... |
| vehicle_m | node_DP0~node_LP0 |
| vehicle_m+1 | node_DP0~node_LP0 |

FIG. 4

| NODE ID / LINK ID | ENTRY PROHIBITION FLAG | TRAVEL-PERMITTED VEHICLE |
|---|---|---|
| node1 | 0 | vehicle_1 |
| link1 | 0 | vehicle_1 |
| node2 | 0 | vehicle_1 |
| link2 | 0 | null |
| node3 | 0 | null |
| link3 | 0 | null |
| ... | ... | ... |
| node_n | 0 | vehicle_2 |
| link_n | 0 | vehicle_2 |
| node_n+1 | 1 | null |
| link_n+1 | 1 | null |
| node_n+2 | 1 | null |
| link_n+2 | 0 | null |

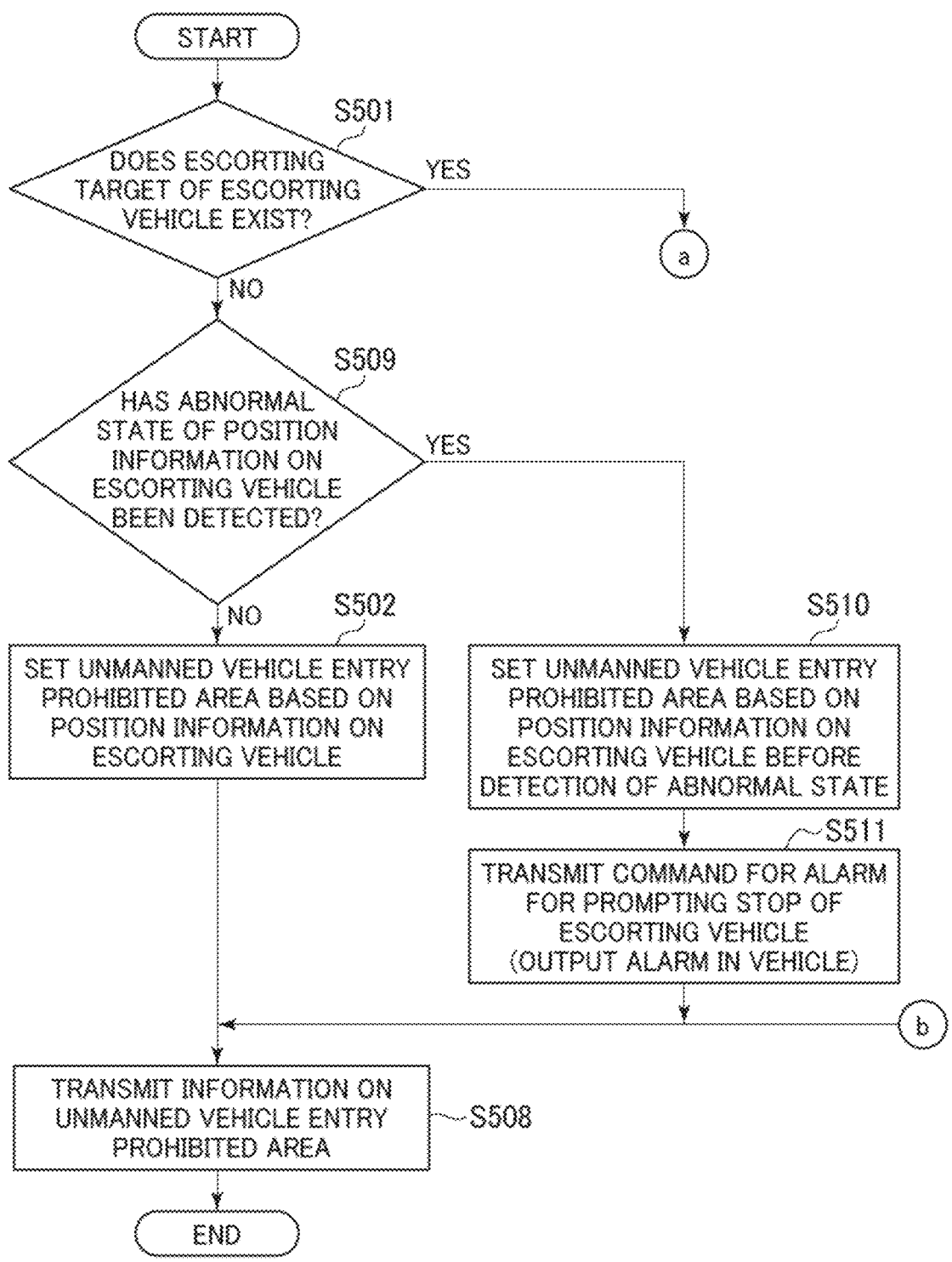

VEHICLE MANAGEMENT SYSTEM

TECHNICAL FIELD

The present invention relates to a vehicle management system provided with an unmanned vehicle, a manned vehicle, and a control station which controls the unmanned vehicle on the basis of position information on the manned vehicle.

BACKGROUND ART

Patent Document 2 discloses a vehicle management system operated in a mine. This vehicle management system includes an unmanned vehicle (for example, a dump truck) which can autonomously travel, a manned vehicle (for example, a passenger vehicle) driven by a driver aboard, and a control station which applies control to the unmanned vehicle on the basis of position information on the manned vehicle. The unmanned vehicle, the manned vehicle, and the control station are configured so as to be capable of communicating with each other.

The control station includes a controller. The controller sets an entry prohibited area of the unmanned vehicle on the basis of the position information on the manned vehicle and applies control to the unmanned vehicle such that the unmanned vehicle does not enter the entry prohibited area. Describing more particularly, the controller detects an abnormal state of position information on the manned vehicle on the basis of a communication state of and position precision information on the manned vehicle. The controller sets the entry prohibited area of the unmanned vehicle on the basis of the current position information on the manned vehicle when the abnormal state of the position information on the manned vehicle has not been detected.

The controller sets the entry prohibited area of the unmanned vehicle on the basis of the position information obtained before the detection of the abnormal state when the abnormal state of the position information on the manned vehicle has been detected. In this state, the entry prohibited area of the unmanned vehicle is extended compared with that at the time when the abnormal state of the position information on the manned vehicle has not been detected. As a result, the vehicle control management system avoids a collision between the manned vehicle and the unmanned vehicle even when the abnormal state of the position information on the manned vehicle has been detected.

PRIOR ART DOCUMENT

Patent Documents

Patent Document 1: JP-2020-155014-A
Patent Document 2: WO2016/039489A1

SUMMARY OF THE INVENTION

Problem to be Solved by the Invention

When the above-mentioned manned vehicle is a vehicle stationing in a working site such as a mine (for example, a passenger vehicle used to transport workers), a position sensor which can acquire the position information and the position precision information on the own vehicle and a management controller which transmits the position information and the position precision information acquired by the position sensor to the control station are mounted in advance. However, when the manned vehicle is a vehicle temporarily stationing in the working site (for example, an emergency vehicle or a cleaning vehicle), it is required to temporarily mount the above-mentioned position sensor and management controller. It is required for the former vehicle (hereinafter referred to as escorting vehicle) including the position sensor and the management controller mounted in advance to precede and escort the latter vehicle (hereinafter referred to as escorted vehicle) including the position sensor and the management controller temporarily mounted in order to check the own vehicle position. In Patent Document 1, there is disclosed a technology of setting one of a plurality of work machines to a lead machine, and causing the other work machines to follow the lead machine. In Patent Document 1, an operator remotely operates the lead machine (escorting vehicle), and the following work machines (escorted vehicles) are controlled to follow a travel route of the lead machine, but there is not assumed a case in which both of the escorting vehicle and the escorted vehicles are manned vehicles.

It is assumed such a case that the technology described in Patent Document 2 is employed for a vehicle management system provided with an unmanned vehicle, the above-mentioned escorting vehicle and escorted vehicle, and a control station which applies control to the unmanned vehicle on the basis of position information on the escorting vehicle and position information on the escorted vehicle. That is, the controller of the control station detects an abnormal state of the position information on the escorted vehicle on the basis of a communication state of and position precision information on the escorted vehicle. Moreover, the entry prohibited area of the unmanned vehicle is extended when the abnormal state of the position information on the escorted vehicle has been detected compared with a case in which the abnormal state of the position information on the escorted vehicle has not been detected. As a result, it is possible to avoid a collision between the escorted vehicle and the unmanned vehicle, to thereby be capable of securing safety of the escorted vehicle. However, as an elapsed time since the detection of the abnormal state of the position information on the escorted vehicle increases, the entry prohibited area of the unmanned vehicle increases, and hence an area in which the unmanned vehicle can travel decreases. Accordingly, a decrease in productivity is caused.

The present invention has been made in view of the circumstances mentioned above. It is an object of the present invention to provide a vehicle management system capable of securing safety of an escorted vehicle while suppressing a decrease in productivity by improving setting of an entry prohibited area of an unmanned vehicle at the time when an abnormal state of position information on the escorted vehicle has been detected.

Means for Solving the Problem

In order to solve such a problem as mentioned above, the present invention provides a vehicle management system configured such that a unmanned vehicle that is capable of autonomously traveling, an escorted vehicle that is a manned vehicle, an escorting vehicle that is a manned vehicle and precedes the escorted vehicle to escort the escorted vehicle, and a control station that controls the unmanned vehicle on the basis of position information on the escorting vehicle and position information on the escorted vehicle are capable of communicating with each other, in which the control station receives position information on the unmanned vehicle acquired by a first position sensor provided to the unmanned vehicle, and transmits a command to a travel controller that is provided to the unmanned vehicle and controls travel of the unmanned vehicle, the control station receives position information and position precision information on the escorted vehicle acquired by a second position sensor provided to the escorted vehicle, the control station receives information on the escorted vehicle set as an escorting target of the escorting vehicle by a setting device provided to the escorting vehicle and position information and position precision information on the escorting vehicle acquired by a third position sensor provided to the escorting vehicle and outputs a command to a management controller that controls an output device provided to the escorting vehicle and capable of outputting an alarm, the control station includes a controller that sets an entry prohibited area for the unmanned vehicle on the basis of the position information on the escorting vehicle and the position information on the escorted vehicle and controls the unmanned vehicle such that the unmanned vehicle does not enter the entry prohibited area, the controller is configured to determine whether or not an abnormal state of the position information on the escorted vehicle has been detected on the basis of a communication state of and the position precision information on the escorted vehicle, set the entry prohibited area of the unmanned vehicle on the basis of the position information on the escorting vehicle and the position information on the escorted vehicle when the abnormal state of the position information on the escorted vehicle has not been detected, and compute, when the abnormal state of the position information on the escorted vehicle has been detected, an inter-vehicle distance between the escorting vehicle and the escorted vehicle on the basis of the position information on the escorting vehicle and the position information on the escorted vehicle that are obtained before the detection of the abnormal state, to thereby set the entry prohibited area of the unmanned vehicle on the basis of the current position information on the escorting vehicle and the inter-vehicle distance, and the output device outputs an alarm which prompts maintenance of the inter-vehicle distance between the escorting vehicle and the escorted vehicle when the abnormal state of the position information on the escorted vehicle has been detected.

Advantages of the Invention

According to the present invention, the safety of the escorted vehicle can be secured while suppressing the decrease in productivity by improving the setting of the entry prohibited area of the unmanned vehicle at the time when the abnormal state of the position information on the escorted vehicle has been detected.

BRIEF DESCRIPTION OF THE DRAWINGS

FIG. 3 is a table for showing a specific example of dispatch information in the first embodiment of the present invention.

FIG. 4 is a table for showing a specific example of control information in the first embodiment of the present invention.

FIG. 8 is a flowchart for showing the setting processing for the unmanned vehicle entry prohibited area of the controller in a second embodiment of the present invention.

MODES FOR CARRYING OUT THE INVENTION

A description is now given of a first embodiment of the present invention with reference to drawings.

Figure 1:
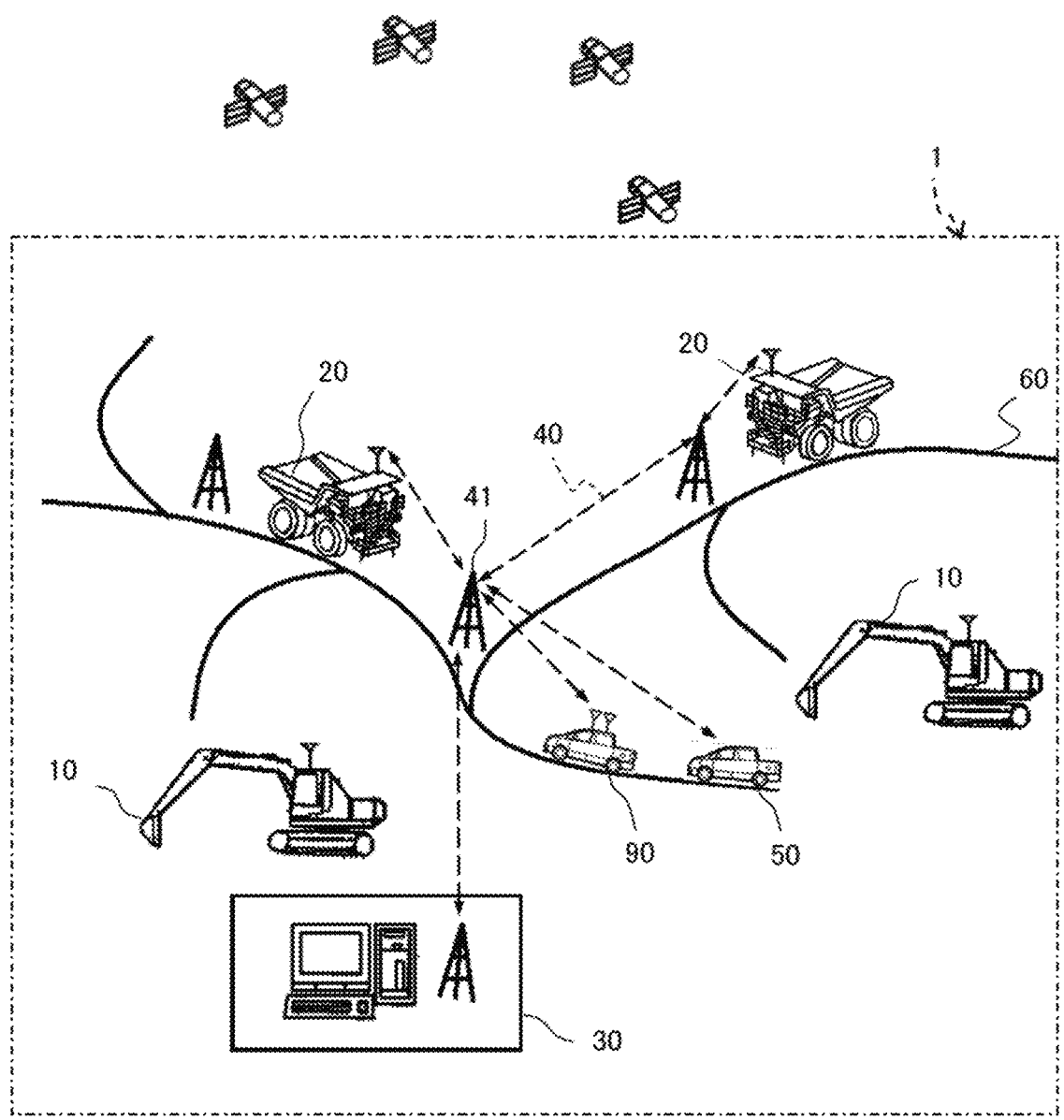
FIG. 1 is a schematic diagram for showing a configuration of a vehicle management system in a first embodiment of the present invention.
Figure 2:
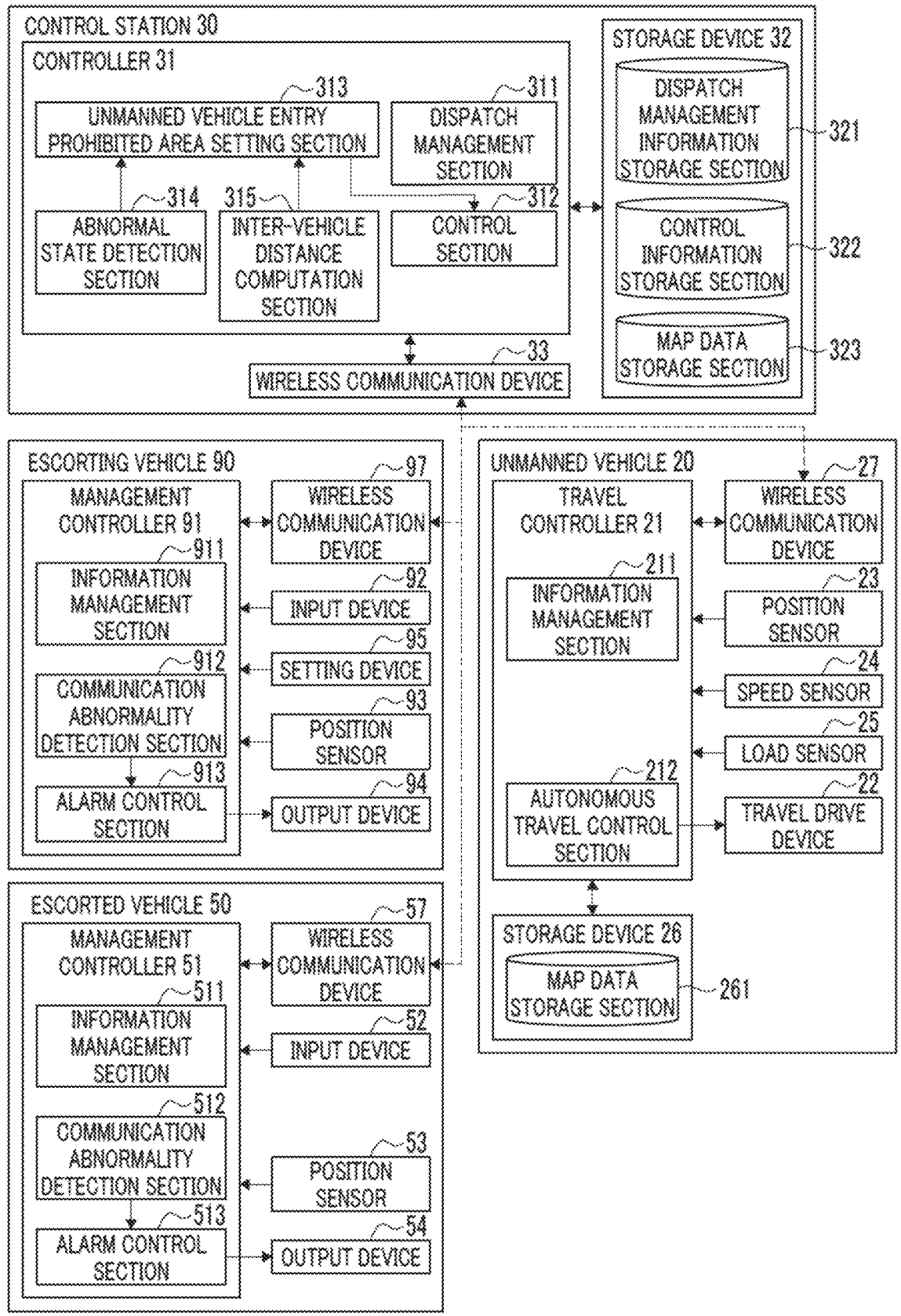
FIG. 2 is a block diagram for showing a configuration of the vehicle management system in the first embodiment of the present invention.

FIG. 1 is a schematic diagram for showing a configuration of a vehicle management system in the present embodiment. FIG. 2 is a block diagram for showing a configuration of the vehicle management system in the present embodiment. Note that, the number of each of unmanned vehicles, escorted vehicles, and escorting vehicles is one in FIG. 2 for the convenience of description, but the number of each thereof may be equal to or larger than two.

A vehicle management system 1 according to the present embodiment is operated in a working site such as a mine. This vehicle management system 1 is provided with one or more loading machines 10 which carries out excavating work and loading work, one or more unmanned vehicles 20 which travel on a transportation road 60 of the working site and transport sediment and the like loaded from the loading machines 10, an escorted vehicle 50 which is a manned vehicle (in other words, a vehicle on which a driver is riding, and is driven by the driver), an escorting vehicle 90 which is a manned vehicle and precedes the escorted vehicle 50 to escort the escorted vehicle 50, and a control station 30 which applies control to the unmanned vehicles 20 on the basis of position information on the escorting vehicle 90 and position information on the escorted vehicle 50.

The unmanned vehicles 20, the escorted vehicle 50, the escorting vehicle 90, and the control station 30 are configured to be capable of communicating with each other via wireless communication lines 40. Specifically, a plurality of wireless base stations 41 are installed in the working site, and the unmanned vehicles 20, the escorted vehicle 50, the escorting vehicle 90, and the control station 30 communicate with each other via the wireless base stations 41.

In the control of the control station 30 in the present embodiment, there is employed a so-called travel-permitted zone control method in which the transportation road in map data is formed of zones divided at nodes and traveling in the zone is exclusively permitted based on the position of the unmanned vehicle 20. Describing more particularly, for example, when the travel of other vehicles is not permitted in a zone in front of the unmanned vehicle 20 and this zone is not set as an entry prohibited area, the travel of the unmanned vehicle 20 is permitted. Meanwhile, when the travel of other vehicles in the zone in front of the unmanned vehicle 20 is permitted or this zone is set as an entry prohibited area, the travel of the unmanned vehicle 20 is not permitted. In this case, the unmanned vehicle 20 waits until the travel in the front zone is permitted.

The unmanned vehicle 20 is, for example, a dump truck which can autonomously travel based on a command of the control station 30. The unmanned vehicle 20 includes a travel controller 21, a travel drive device 22, a position sensor 23, a speed sensor 24, a load sensor 25, a storage device 26, and a wireless communication device 27.

The travel drive device 22 of the unmanned vehicle 20 carries out driving in accordance with a control signal of the travel controller 21 to cause the unmanned vehicle 20 to travel. The travel drive device 22 includes, for example, a steering motor which changes a steering angle of the unmanned vehicle 20, a travel motor which causes the unmanned vehicle 20 to travel, and a brake.

The position sensor 23 of the unmanned vehicle 20 measures the position of the unmanned vehicle 20 (own vehicle), and outputs the measured position to the travel controller 21. Note that, the position sensor 23 is, for example, the GPS (Global Positioning System) which uses signals from the satellites to identify the position, a combination of the GPS and an inertial measurement device (IMU: Inertial Measurement), or a sensor which uses radio waves from ground base stations to identify the position.

The speed sensor 24 of the unmanned vehicle 20 measures the speed of the unmanned vehicle 20 (own vehicle), and outputs the measured speed to the travel controller 21. Note that, the speed sensor 24 is, for example, a rotary encoder for detecting a rotation speed of a wheel, the GPS which measures the speed from a change amount of the position of the unmanned vehicle 20, an inertial measurement device, or a speed estimation device which is a combination thereof.

The load sensor 25 of the unmanned vehicle 20 measures the weight of a load (that is, load amount) loaded on the unmanned vehicle 20 (own vehicle) and outputs the measured load amount to the travel controller 21. Note that, the load sensor 25 is, for example, a weight sensor provided to a seating portion of a vessel, or a sensor which estimates the weight based a pressure in a cylinder for operating the vessel.

The storage device 26 of the unmanned vehicle 20 is a nonvolatile storage medium from and to which information can be read and written, and stores an OS (Operating System), various control programs, application programs, databases, and the like. Moreover, the storage device 26 includes a map data storage section 261 for storing map data.

The wireless communication device 27 of the unmanned vehicle 20 is a wireless device for connecting the travel controller 21 and the wireless communication line 40 to each other. The travel controller 21 of the unmanned vehicle 20 transmits and receives information and commands to and from a controller 31 of the control station 30 via the wireless communication device 27 or the like.

The travel controller 21 of the unmanned vehicle 20 is formed of, for example, a microcomputer constructed by combining a CPU (Central Processing Unit) which carries out computing, a ROM (Read Only Memory) which serves as a secondary storage device recording programs for the computing, a RAM (Random Access Memory) which serves as a transitory storage device for storing progress of the computing and storing temporary control variables. The travel controller 21 includes, as functional components, an information management section 211 and an autonomous travel control section 212.

The information management section 211 of the travel controller 21 manages the information on the position acquired by the position sensor 23, the information on the speed acquired by the speed sensor 24, and the information on the load amount acquired by the load sensor 25 and transmits these pieces of information to the controller 31 of the control station 30.

The autonomous travel control section 212 of the travel controller 21 generates control signals (for example, an acceleration/deceleration control signal and a steering control signal) for causing the unmanned vehicle 20 to travel such that the unmanned vehicle 20 does not deviate from the travel-permitted zone while following a travel path, on the basis of the above-mentioned information on the position, the speed, and the load amount and a command (specifically, information on the travel path and the travel-permitted zone of the unmanned vehicle 20) received from the controller 31 of the control station 30. The autonomous travel control section 212 outputs the generated control signals to the travel drive device 22. As a result, the travel of the unmanned vehicle 20 is controlled.

The escorting vehicle 90 is a vehicle stationing in the working site (for example, a passenger vehicle used to move workers), and a management controller 91, an input device 92, a position sensor 93, an output device 94, a setting device 95, and a wireless communication device 97 are mounted thereto in advance.

The input device 92 of the escorting vehicle 90 is, for example, a touch panel or a button provided to an edge of a monitor and outputs, when a driver of the escorting vehicle 90 operates the input device 92, information on the operation to the management controller 91.

The position sensor 93 of the escorting vehicle 90 measures the position of the escorting vehicle 90 (own vehicle) and outputs the measured position to the management controller 91. Moreover, the position sensor 93 also computes a position precision when the position is measured and outputs information on the computed position precision to the management controller 91. Note that, the position sensor 93 is, for example, the GPS, and the position precision information is, for example, information on the positioning mode of the GPS (for example, information indicating whether the positioning mode is a high-precision positioning mode which uses a correction signal, a stand-alone positioning mode which does not use a correction signal, or a state in which the measurement is impossible).

The output device 94 of the escorting vehicle 90 is, for example, a liquid crystal monitor and a speaker, and carries out, in accordance with a command from the management controller 91, display of information on states of the escorting vehicle 90 (own vehicle) and a surrounding environment and output of an alarm (for example, display of a message on the monitor or sounding of alarm sound from the speaker). Note that, the output device 94 may integrally be formed with the input device 92.

The setting device 95 of the escorting vehicle 90 is, for example, a touch panel or a button provided to an edge of the monitor, and sets the escorted vehicle 50 being an escorting target of the escorting vehicle 90 (own vehicle) (details will be mentioned later). Note that, the setting device 95 may also serve as the input device 92.

The wireless communication device 97 of the escorting vehicle 90 is a wireless device for connecting the management controller 91 and the wireless communication line 40 to each other. The management controller 91 of the escorting vehicle 90 transmits and receives information and commands to and from the controller 31 of the control station 30 via the wireless communication device 97 or the like.

The management controller 91 of the escorting vehicle 90 is formed of, for example, a microcomputer constructed by combining a CPU which carries out computing, a ROM serving as a secondary storage device for recording programs for the computing, a RAM serving as a transitory storage device for storing progress of the computing and storing temporary control variables. The management controller 91 includes, as functional components, an information management section 911, a communication abnormality detection section 912, and an alarm control section 913.

The information management section 911 of the management controller 91 manages the position information and the position precision information acquired by the position sensor 93, the operation information input on the input device 92, and the information on the escorted vehicle set by the setting device 95, and periodically transmits these pieces of information to the controller 31 of the control station 30. This transmission cycle is, for example, 0.5 seconds.

The communication abnormality detection section 912 of the management controller 91 periodically receives a signal from the controller 31 of the control station 30. This reception cycle is, for example, 0.5 seconds which is the same as the transmission cycle. The communication abnormality detection section 912 determines that a communication state between the escorting vehicle 90 and the control station 30 is abnormal when a state in which the signal from the controller 31 of the control station 30 is not received has continued until a predetermined time (for example, five seconds) has elapsed.

The alarm control section 913 of the management controller 91 outputs a command to the output device 94, when the communication abnormality detection section 912 determined that the communication state between the escorting vehicle 90 and the control station 30 is abnormal, to thereby cause the output device 94 to output alarm. Moreover, the alarm control section 913 outputs a command to the output device 94, when the alarm control section 913 receives a command for alarm from the controller 31 of the control station 30, to thereby cause the output device 94 to output alarm (details will be mentioned later).

The escorted vehicle 50 is a vehicle temporarily stationing in the working site (for example, an emergency vehicle or a cleaning vehicle), and temporarily mounts a management controller 51, an input device 52, a position sensor 53, an output device 54, and a wireless communication device 57. Note that, the management controller 51, the input device 52, the position sensor 53, the output device 54, and the wireless communication device 57 may be integrally formed as a portable terminal.

The input device 52 of the escorted vehicle 50 is, for example, a touch panel or a button provided to an edge of the monitor and outputs, when a driver of the escorted vehicle 50 operates the input device 52, information on the operation to the management controller 51.

The position sensor 53 of the escorted vehicle 50 measures the position of the escorted vehicle 50 (own vehicle) and outputs the measured position to the management controller 51. Moreover, the position sensor 53 computes a position precision when the position is measured, and outputs information on the computed position precision to the management controller 51. Note that, the position sensor 53 is, for example, the GPS, and the position precision information is, for example, information on the positioning mode of the GPS (for example, information indicating whether the positioning mode is the high-precision positioning mode which uses a correction signal, the stand-alone positioning mode which does not use a correction signal, or the state in which the measurement is impossible).

The output device 54 of the escorted vehicle 50 is, for example, a liquid crystal monitor and a speaker, and carries out, in accordance with a command from the management controller 51, display of information on states of the escorted vehicle 50 (own vehicle) and a surrounding environment and output of an alarm (for example, display of a message on the monitor or sounding of alarm sound from the speaker). Note that, the output device 54 may integrally be formed with the input device 52.

The wireless communication device 57 of the escorted vehicle 50 is a wireless device for connecting the management controller 51 and the wireless communication line 40 to each other. The management controller 51 of the escorted vehicle 50 transmits and receives information and commands to and from the controller 31 of the control station 30 via the wireless communication device 57 or the like.

The management controller 51 of the escorted vehicle 50 is formed of, for example, a microcomputer constructed by combining a CPU which carries out computing, a ROM which serves as a secondary storage device for recording programs for the computing, and a RAM which serves as a transitory storage device for storing progress of the computing and storing temporary control variables. The management controller 51 includes, as functional components, an information management section 511, a communication abnormality detection section 512, and an alarm control section 513.

The information management section 511 of the management controller 51 manages the position information and the position precision information acquired by the position sensor 53 and the operation information input on the input device 52, and periodically transmits these pieces of information to the controller 31 of the control station 30. This transmission cycle is, for example, 0.5 seconds.

The communication abnormality detection section 512 of the management controller 51 periodically receives the signal from the controller 31 of the control station 30. This reception cycle is, for example, 0.5 seconds which is the same as the transmission cycle. The communication abnormality detection section 512 determines that a communication state between the escorted vehicle 50 and the control station 30 is abnormal when a state in which the signal from the controller 31 of the control station 30 is not received has continued, and a predetermined time (for example, five seconds) has elapsed.

The alarm control section 513 of the management controller 51 outputs a command to the output device 54 when the communication abnormality detection section 512 determines that the communication state between the escorted vehicle 50 and the control station 30 is abnormal, to thereby cause the output device 54 to output an alarm. Moreover, the alarm control section 513 outputs a command to the output device 94 when the alarm control section 513 receives the command for the alarm from the controller 31 of the management station 31, to thereby cause the output device 94 to output the alarm (details will be mentioned later).

The control station 30 includes the controller 31, a storage device 32, and a wireless communication device 33.

The storage device 32 of the control station 30 is a nonvolatile storage medium to and from which information can be read and written and in which an OS and various control programs, application programs, databases, and the like are stored. The storage device 32 includes a dispatch management information storage section 321, a control information storage section 322, and a map data storage section 323.

The wireless communication device 33 of the control station 30 is a wireless device for connecting the controller 31 and the wireless communication line 40 to each other. The controller 31 of the control station 30 transmits and receives the information and the commands to and from the travel controller 21 of the unmanned vehicle 20, the management controller 91 of the escorting vehicle 90, or the management controller 51 of the escorted vehicle 50 via the wireless communication device 33 or the like.

The controller 31 of the control station 30 is formed of, for example, a microcomputer constructed by combining a CPU which carries out computing, a ROM serving as a secondary storage device for recording programs for the computing, and a RAM serving as a transitory storage device for storing progress of the computing and storing temporary control variables. The controller 31 includes, as functional components, a dispatch management section 311, a control section 312, an unmanned vehicle entry prohibited area setting section 313, an abnormal state detection section 314, and an inter-vehicle distance computation section 315.

The dispatch management section 311 of the controller 31 sets a travel path to a destination of the unmanned vehicle 20 on the basis of position information on the unmanned vehicle 20 received from the travel controller 21 of the unmanned vehicle 20. For example, the dispatch management section 311 sets a travel path of the unmanned vehicle 20 to a dumping place when the unmanned vehicle 20 exists in a loading place. Moreover, for example, the dispatch management section 311 sets a travel path of the unmanned vehicle 20 to the loading place when the unmanned vehicle 20 exists in the dumping place. The dispatch management section 311 stores, as dispatch management information, the set travel path of the unmanned vehicle 20 in the dispatch management information storage section 321 of the storage device 32.

The dispatch management information has, for example, a tabular form as shown in FIG. 3 and includes vehicle IDs each of which is identification information on the unmanned vehicle and travel paths each set for each vehicle ID. The travel path is, for example, a travel path from an exit point node_Lout of the loading place to an entrance point node_Din of the dumping place or a travel path from an exit point node_Dout of the dumping place to an entrance point node_Lin of the loading place. The travel path conforms to the transportation road in the map data, and is formed of zones divided at nodes.

The unmanned vehicle entry prohibited area setting section 313 of the controller 31 sets an entry prohibited area of the unmanned vehicle 20 (details will be mentioned later) on the basis of the position information on the escorting vehicle 90 received from the management controller 91 of the escorting vehicle 90 and the position information on the escorted vehicle 50 received from the management controller 51 of the escorted vehicle 50 and stores, as control information, this entry prohibited area in the control information storage section 322.

The control section 312 of the controller 31 extracts a zone in front of the unmanned vehicle 20 on the basis of the position information on the unmanned vehicle 20 received from the travel controller 21 of the unmanned vehicle 20, sets the zone in front of the unmanned vehicle 20 as a travel-permitted zone of the unmanned vehicle 20 when this zone is not set as a travel-permitted zone of another vehicle and is not set as an entry prohibited area, and stores, as control information, this travel-permitted zone in the control information storage section 322 of the storage device 32.

The control information has, for example, a tabular form as shown in FIG. 4 and includes "node IDs/link IDS," "entry prohibition flags" each of which indicates whether or not a zone indicated by each node ID/link ID is an unmanned vehicle entry prohibited area, and "travel permitted vehicles" each of which indicates whether or not the zone indicated by each node ID/link ID is a travel permitted zone of an unmanned vehicle and identification information on an unmanned vehicle.

The abnormal state detection section 314 of the controller 31 detects an abnormal state of the position information on the escorted vehicle 50 on the basis of the communication state of and the position precision information on the escorted vehicle 50. Describing more particularly, the abnormal state detection section 314 periodically receives a signal from the management controller 51 of the escorted vehicle 50. This reception cycle is, for example, 0.5 seconds. The communication state between the escorted vehicle 50 and the control station 30 is abnormal when a state in which the signal from the management controller 51 of the escorted vehicle 50 is not received has continued until a predetermined time (for example, five seconds) has elapsed, and hence the abnormal state detection section 314 detects the abnormal state of the position information on the escorted vehicle 50. Moreover, the abnormal state detection section 314 detects the abnormal state of the position information on the escorted vehicle 50 when the position precision information on the escorted vehicle 50 received from the management controller 51 of the escorted vehicle 50 is lower than a predetermined level.

The inter-vehicle distance computation section 315 of the controller 31 computes the inter-vehicle distance between the escorting vehicle 90 and the escorted vehicle 50 along the transportation road on the basis of the position information on the escorting vehicle 90 and the position information on the escorted vehicle 50 (specifically, the escorted vehicle 50 set as the escorting target of the escorting vehicle 90) that are obtained before the detection of the abnormal state mentioned above.

A description is now given of a method of setting the escorting target of the escorting vehicle 90.

Figure 5A:
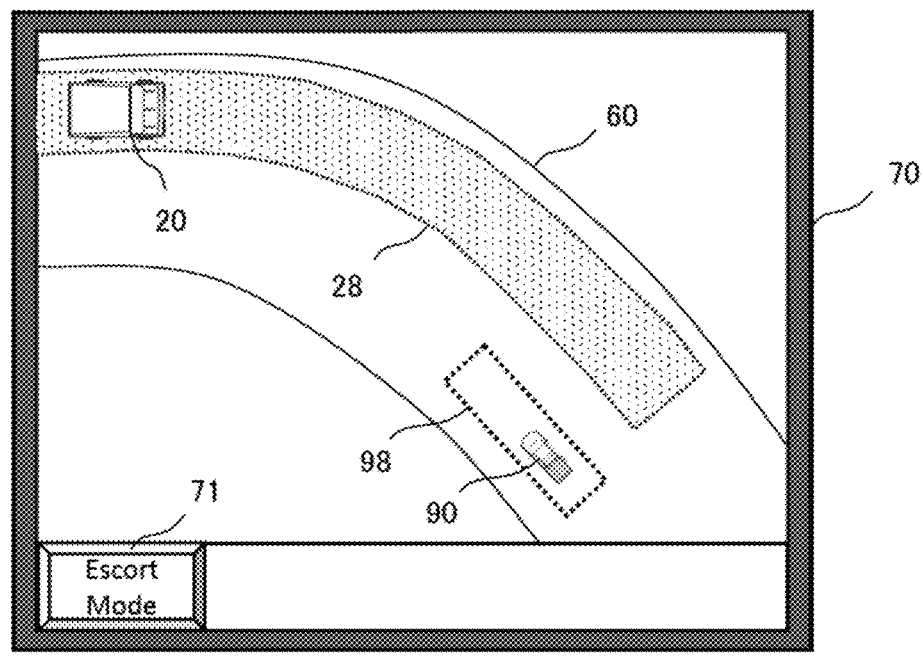
FIGS. 5A and 5B are views for showing a specific example of a screen of an output device of an escorting vehicle in the first embodiment of the present invention.

The output device 94 of the escorting vehicle 90 usually displays a screen 70 showing surrounding environment information on the escorting vehicle 90 (own vehicle). For example, as shown in FIG. 5A, on the screen 70, there are displayed the shape of the transportation road 60, the position of the escorting vehicle 90, the entry prohibited area 98 of the unmanned vehicles set based on the position of the escorting vehicle 90, the position of the unmanned vehicle 20, and the travel-permitted zone 28 set to the unmanned vehicle 20.

Figure 5B:
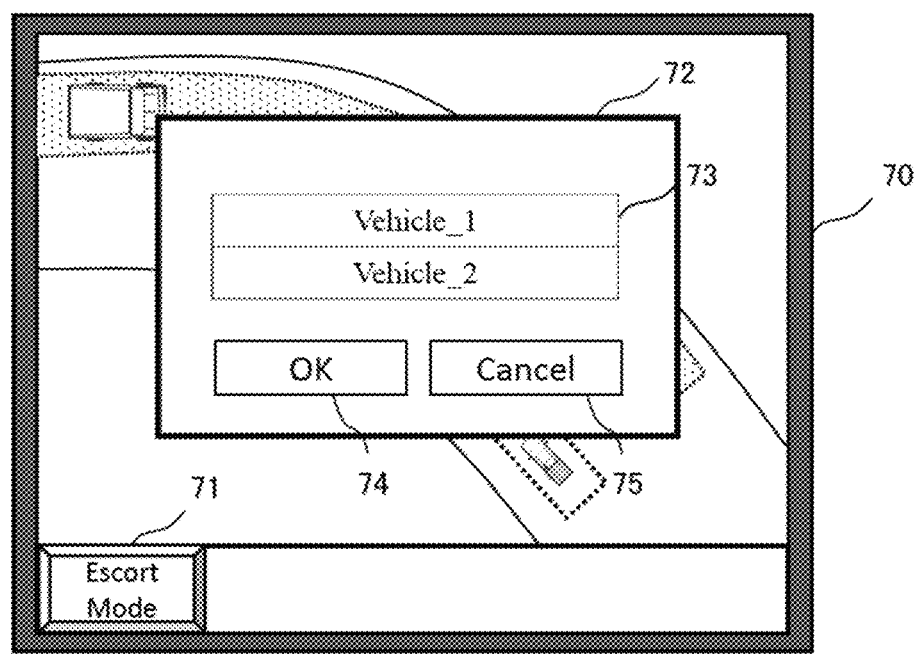

The screen 70 includes an escort mode button 71. When the escort mode button 71 is operated by the setting device 95 of the escorting vehicle 90, a selection dialog 72 is displayed on the output device 94. For example, as shown in FIG. 5B, the selection dialog 72 includes an escort target list 73 indicating a plurality of escorted vehicles (vehicle IDs), an OK button 74, and a Cancel button 75. When one escorting vehicle in the escort target list 73 is selected and the OK button 74 is operated by the setting device 95, the escort target of the escorting vehicle 90 is set. When the Cancel button 75 is operated by the setting device 95, the display of the selection dialog 72 is canceled.

The information management section 911 of the management controller 91 of the escorting vehicle 90 manages the information on the escorted vehicle 50 set as the escorting target of the escorting vehicle 90 as mentioned above and transmits this information to the controller 31 of the control station 30.

Figure 6:
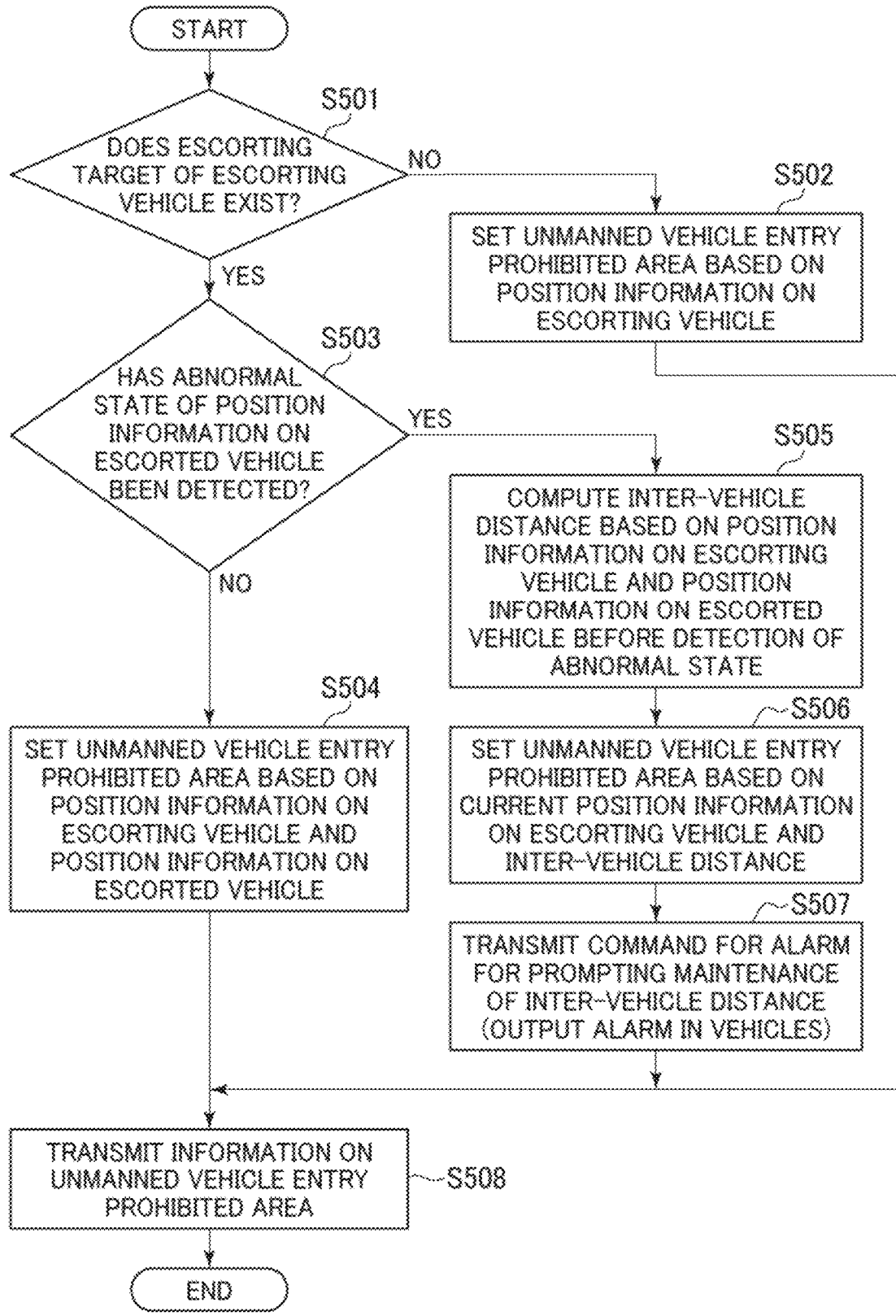
FIG. 6 is a flowchart for showing setting processing for an unmanned vehicle entry prohibited area of a controller in the first embodiment of the present invention.

A description is now given of setting processing for the unmanned vehicle entry prohibited area of the controller 31 with reference to FIG. 6. FIG. 6 is a flowchart for showing the setting processing for the unmanned vehicle entry prohibited area by the controller in the present embodiment.

The unmanned vehicle entry prohibited area setting section 313 of the controller 31 determines whether or not the escorting target of the escorting vehicle 90 is set in step S501. The unmanned vehicle entry prohibited area setting section 313 of the controller 31 proceeds to step S502 when the escorting target of the escorting vehicle 90 is not set. The unmanned vehicle entry prohibited area setting section 313 of the controller 31 sets an unmanned vehicle entry prohibited area on the basis of the position information on the escorting vehicle 90 in step S502.

Figure 7A:
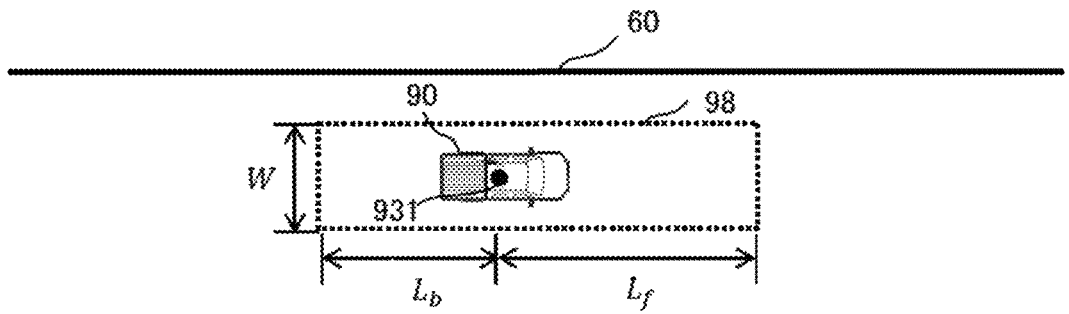
FIGS. 7A, 7B and 7C are diagrams for showing a setting method for the unmanned vehicle entry prohibited area in the first embodiment of the present invention.

Describing more particularly with reference to FIG. 7A, the unmanned vehicle entry prohibited area setting section 313 of the controller 31 sets a front margin having a length Lf in front in a travel direction computed from a difference from a position of the escorting vehicle 90 at the previous time with a position 931 at the current time as reference coordinates, a rear margin having a length Lb in the rear in the travel direction, and width margins each having a length W/2 on the left and right directions, respectively, (a total length W) perpendicular to the travel direction. Then, the unmanned vehicle entry prohibited area setting section 313 of the controller 31 sets, as the unmanned vehicle entry prohibited area 98, a rectangular area defined by the front margin, the rear margin, and the width margins.

Note that, the unmanned vehicle entry prohibited area 98 can be set such that the escorting vehicle 90 exists in the unmanned vehicle entry prohibited area 98 by appropriately setting each of the parameters Lf, Lb, and W. For example, Lf, Lb, and W may be set such that Lf, Lb, and W change according to vehicle body dimensions of the escorting vehicle 90. Moreover, Lf may be set such that Lf changes according to the speed of the escorting vehicle 90, that is, increases as the speed of the escorting vehicle 90 increases.

The unmanned vehicle entry prohibited area setting section 313 of the controller 31 proceeds to step S503 when an escorting target of the escorting vehicle 90 is set in step S501. The unmanned vehicle entry prohibited area setting section 313 of the controller 31 determines whether or not the abnormal state of the position information on the escorted vehicle 50 set as the escorting target of the escorting vehicle 90 has been detected by the abnormal state detection section 314 in step S503.

The unmanned vehicle entry prohibited area setting section 313 of the controller 31 proceeds to step S504 when the abnormal state of the position information on the escorted vehicle 50 has not been detected in step S503. The unmanned vehicle entry prohibited area setting section 313 of the controller 31 sets an unmanned vehicle entry prohibited area based on the position information on the escorting vehicle 90 and the position information on the escorted vehicle 50 in step S504.

Figure 7B:
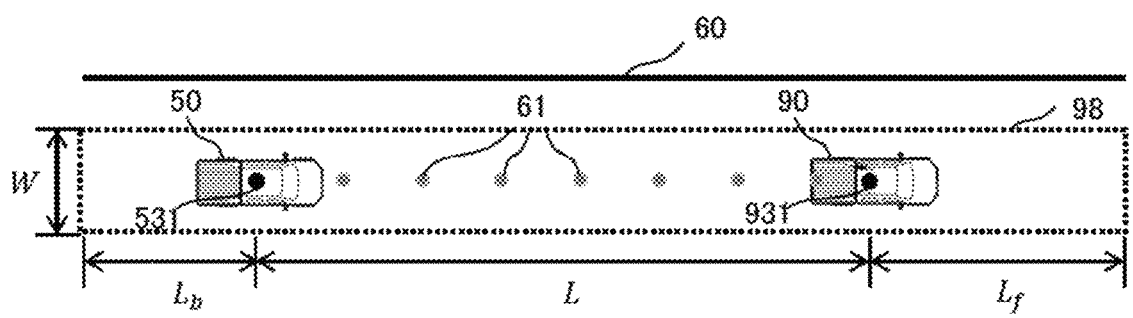

Describing more particularly with reference to FIG. 7B, the unmanned vehicle entry prohibited area setting section 313 of the controller 31 extracts area setting target nodes 61 based on the map data stored in the map data storage section 323, a history of the position of the escorting vehicle 90 within a predetermined time in the past, and the current position of the escorted vehicle 50. That is, for example, the unmanned vehicle entry prohibited area setting section 313 of the controller 31 extracts, as the area setting target nodes 61, nodes up to a node in a vicinity of the position of the escorted vehicle 50 in a node point row of the map data existing in a vicinity of the history of each position of the escorting vehicle 90.

Then, the unmanned vehicle entry prohibited area setting section 313 of the controller 31 sets the front margin having the length Lf in front in the travel direction with the position 931 of the escorting vehicle 90 at the current time as reference coordinates, the rear margin having the length Lb in the rear in the travel direction with the position 531 of the escorted vehicle 50 at the current time as reference coordinates, and sets the width margins each having the length W/2 on the left and right directions, respectively, (the total length W) perpendicular to the travel direction with each of the position 931 of the escorting vehicle 90 at the current time, the position 531 of the escorted vehicle 50 at the current time, and the area setting target nodes 61 as reference coordinates. Then, the unmanned vehicle entry prohibited area setting section 313 of the controller 31 sets, as the unmanned vehicle entry prohibited area 98, a polygonal area defined by the front margin, the rear margin, and the width margins.

The unmanned vehicle entry prohibited area setting section 313 of the controller 31 proceeds to step S505 to step S507 when the abnormal state of the position information on the escorted vehicle 50 has been detected in step S503. The inter-vehicle distance computation section 315 of the controller 31 computes the inter-vehicle distance between the escorting vehicle 90 and the escorted vehicle 50 on the basis of the position information on the escorting vehicle 90 and the position information on the escorted vehicle 50 that are obtained before the detection of the abnormal state in Step S505. The unmanned vehicle entry prohibited area setting section 313 of the controller 31 sets an unmanned vehicle entry prohibited area based on the current position information on the escorting vehicle 90 and the inter-vehicle distance computed by the inter-vehicle distance computation section 315 in step S506.

Figure 7C:
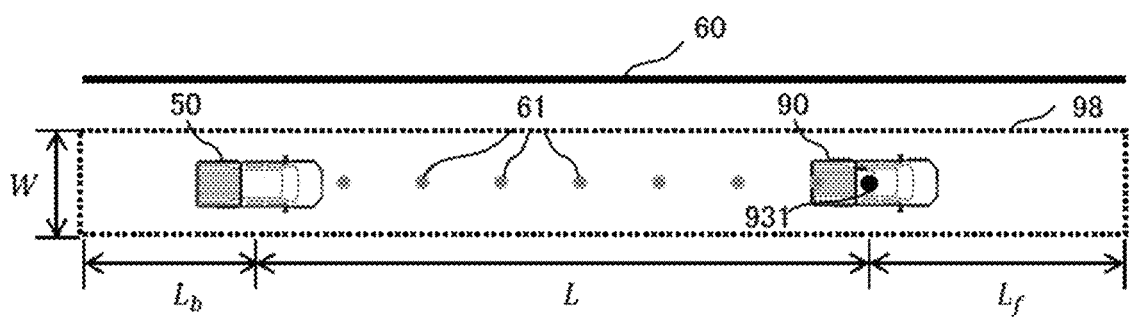

With reference to FIG. 7B showing the state before the detection of the abnormal state and FIG. 7C showing the state after the detection of the abnormal state, a specific description is given. As shown in FIG. 7B, the inter-vehicle distance computation section 315 of the controller 31 sets, as a start point, the position 931 of the escorting vehicle 90 obtained before the detection of the abnormal state, sets, as an end point, the position 531 of the escorted vehicle 50 obtained before the detection of the abnormal state, and computes, as an inter-vehicle distance L, a distance between the start point and the end point along the area setting target nodes 61.

As shown in FIG. 7C, the inter-vehicle distance computation section 315 of the controller 31 extracts the area setting target nodes 61 based on the map data stored in the map data storage section 323, the history of the position of the escorting vehicle 90 within a predetermined time in the past, and the inter-vehicle distance L computed by the inter-vehicle distance computation section 315. That is, for example, the unmanned vehicle entry prohibited area setting section 313 of the controller 31 extracts, as the area setting target nodes 61, nodes up to a rear end node having a distance which is from the position 931 of the escorting vehicle 90 at the current time and corresponds to the inter-vehicle distance L in the node point row of the map data existing in the vicinity of the history of each position of the escorting vehicle 90.

Then, the unmanned vehicle entry prohibited area setting section 313 of the controller 31 sets the front margin having the length Lf in front in the travel direction with the position 931 of the escorting vehicle 90 at the current time as reference coordinates, the rear margin having the length Lb in the rear in the travel direction with the rear end node of the area setting target nodes 61 as reference coordinates, and sets the width margins each having the length W/2 on the left and right directions, respectively, (the total length W) perpendicular to the travel direction with each of the position 931 of the escorting vehicle 90 at the current time and the area setting target nodes 61 as reference coordinates. Then, the unmanned vehicle entry prohibited area setting section 313 of the controller 31 sets, as the unmanned vehicle entry prohibited area 98, a polygonal area defined by the front margin, the rear margin, and the width margins.

The unmanned vehicle entry prohibited area setting section 313 of the controller 31 transmits a command for an alarm for prompting maintenance of the inter-vehicle distance between the escorting vehicle 90 and the escorted vehicle 50 to the management controller 91 of the escorting vehicle 90 and the management controller 51 of the escorted vehicle 50 in step S507. The alarm control section 913 of the management controller 91 of the escorting vehicle 90 outputs a command to the output device 94 when the alarm control section 913 of the management controller 91 of the escorting vehicle 90 receives the command for the alarm mentioned above, to thereby cause the output device 94 to output the alarm for prompting the maintenance of the inter-vehicle distance.

The alarm control section 513 of the management controller 51 of the escorted vehicle 50 outputs a command to the output device 54 when the alarm control section 513 of the management controller 51 of the escorted vehicle 50 receives the command for the alarm mentioned above, to thereby cause the output device 54 to output the alarm for prompting the maintenance of the inter-vehicle distance. The alarm control section 513 of the management controller 51 of the escorted vehicle 50 outputs the command to the output device 54 also when the communication abnormality detection section 512 determines that the communication state between the escorted vehicle 50 and the control station 30 is abnormal, to thereby cause the output device 54 to output the alarm for prompting the maintenance of the inter-vehicle distance. Note that, the alarm control section 513 of the management controller 51 of the escorted vehicle 50 may output the command to the output device 54, to thereby cause the output device 54 to output the alarm for prompting the maintenance of the inter-vehicle distance not when the alarm control section 513 of the management controller 51 of the escorted vehicle 50 receives the command for the alarm mentioned before, but when the position precision information on the escorted vehicle 50 is lower than a predetermined level.

The unmanned vehicle entry prohibited area setting section 313 of the controller 31 proceeds to step S508 when the processing in step S502, step S504, or step S507 is completed. The unmanned vehicle entry prohibited area setting section 313 of the controller 31 causes the control information storage section 322 to store, as the control information, information on the set entry prohibited area, and transmits the information on the set entry prohibited area to the management controller 91 of the escorting vehicle 90 in step S508. The management controller 91 of the escorting vehicle 90 displays the unmanned vehicle entry prohibited area on the screen of the output device 94 on the basis of the received information.

In the vehicle management system 1 according to the present embodiment configured as mentioned above, the controller 31 sets the unmanned vehicle entry prohibited area based on the position information on the escorting vehicle 90 and the position information on the escorted vehicle 50 when the controller 31 does not detect the abnormal state of the position information on the escorted vehicle 50, and hence the collision between the escorting vehicle 90 or the escorted vehicle 50 and the unmanned vehicle 20 can be avoided. The controller 31 sets the unmanned vehicle entry prohibited area based on the position information on the escorting vehicle 90 and the inter-vehicle distance when the controller 31 detects the abnormal state of the position information on the escorted vehicle 50. The output device 94 of the escorting vehicle 90 and the output device 54 of the escorted vehicle 50 outputs the alarm for prompting the maintenance of the inter-vehicle distance, and hence the collision between the escorting vehicle 90 or the escorted vehicle 50 and the unmanned vehicle 20 can be avoided. The unmanned vehicle entry prohibited area in the case in which the abnormal state of the position information on the escorted vehicle 50 has been detected is not extended compared with the unmanned vehicle entry prohibited area in the case in which the abnormal state of the position information on the escorted vehicle 50 has not been detected, which is different from the conventional technology. Thus, a travel available range of the unmanned vehicles 20 does not decrease, and hence a decrease in productivity can be suppressed.

A description is now given of a second embodiment of the present invention. Note that, portions in the present embodiment that are equivalent to their counterparts in the first embodiment are given the same reference characters, and explanation thereof is omitted as appropriate.

The abnormal state detection section 314 of the controller 31 determines, based on the communication state of and the position precision information on the escorting vehicle 90, whether or not the abnormal state of the position information on the escorting vehicle 90 has been detected in the present embodiment. Describing more particularly, the abnormal state detection section 314 periodically receives a signal from the management controller 91 of the escorting vehicle 90. This reception cycle is, for example, 0.5 seconds. The abnormal state detection section 314 determines that the communication state between the escorting vehicle 90 and the control station 30 is abnormal, and hence the abnormal state of the position information on the escorting vehicle 90 is detected when the state in which the signal from the management controller 91 of the escorting vehicle 90 is not received has continued until a predetermined time (for example, five seconds) has elapsed. Moreover, the abnormal state detection section 314 determines that the abnormal state of the position information on the escorting vehicle 90 is detected when the position precision information on the escorting vehicle 90 received from the management controller 91 of the escorting vehicle 90 is lower than a predetermined level.

The unmanned vehicle entry prohibited area setting section 313 of the controller 31 sets the unmanned vehicle entry prohibited area corresponding to not only the case in which the abnormal state of the position information on the escorted vehicle 50 has been detected, but also a case in which an abnormal state of the position information on the escorting vehicle 90 has been detected.

Figure 9:
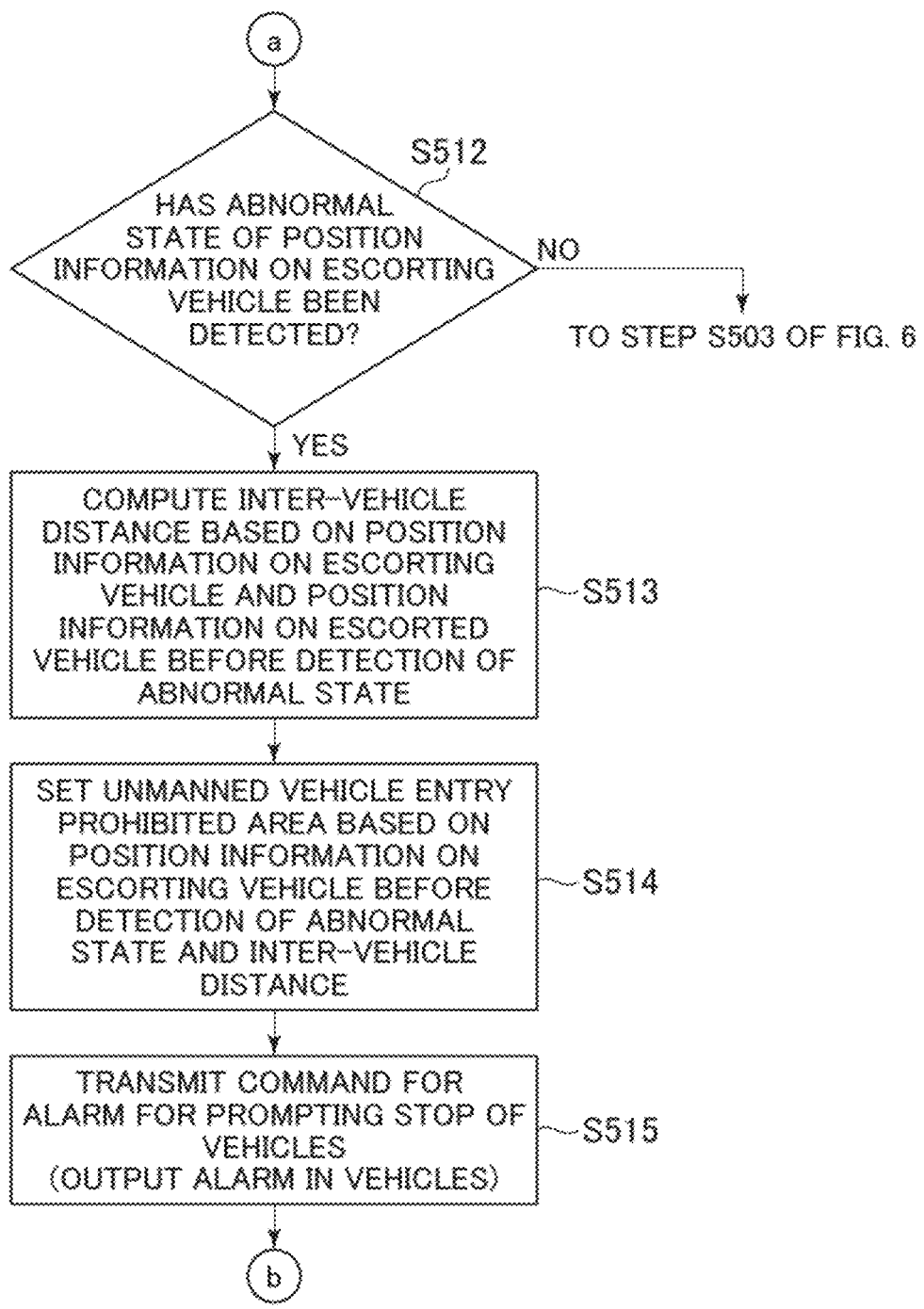
FIG. 9 is a flowchart for showing the setting processing for the unmanned vehicle entry prohibited area of the controller in the second embodiment of the present invention.

FIG. 8 and FIG. 9 are flowcharts for showing the setting processing for the unmanned vehicle entry prohibited area by the controller in the present embodiment.

The unmanned vehicle entry prohibited area setting section 313 of the controller 31 determines whether or not the escorting target of the escorting vehicle 90 is set in step S501. The unmanned vehicle entry prohibited area setting section 313 of the controller 31 proceeds to step S509 when the escorting target of the escorting vehicle 90 is not set.

The unmanned vehicle entry prohibited area setting section 313 of the controller 31 determines whether or not the abnormal state of the position information on the escorting vehicle 90 has been detected by the abnormal state detection section 314 in step S509. The unmanned vehicle entry prohibited area setting section 313 of the controller 31 proceeds to step S502 when the abnormal state of the position information on the escorting vehicle 90 has not been detected. The unmanned vehicle entry prohibited area setting section 313 of the controller 31 sets the unmanned vehicle entry prohibited area based on the position information on the escorting vehicle 90 in step S502 (details are the same as those of the first embodiment).

The unmanned vehicle entry prohibited area setting section 313 of the controller 31 proceeds to step S510 when the abnormal state of the position information on the escorting vehicle 90 has been detected in step S509. The unmanned vehicle entry prohibited area setting section 313 of the controller 31 sets the unmanned vehicle entry prohibited area based on the position information on the escorting vehicle 90 obtained before the detection of the abnormal state in step S510. The unmanned vehicle entry prohibited area setting section 313 of the controller 31 transmits a command for an alarm for prompting stop of the escorting vehicle 90 to the management controller 91 of the escorting vehicle 90 in Step S511. The alarm control section 913 of the management controller 91 of the escorting vehicle 90 outputs a command to the output device 94 when the alarm control section 913 of the management controller 91 of the escorting vehicle 90 receives the command for the alarm mentioned above, to thereby cause the output device 94 to output the alarm for prompting the stop.

Figure 10A:
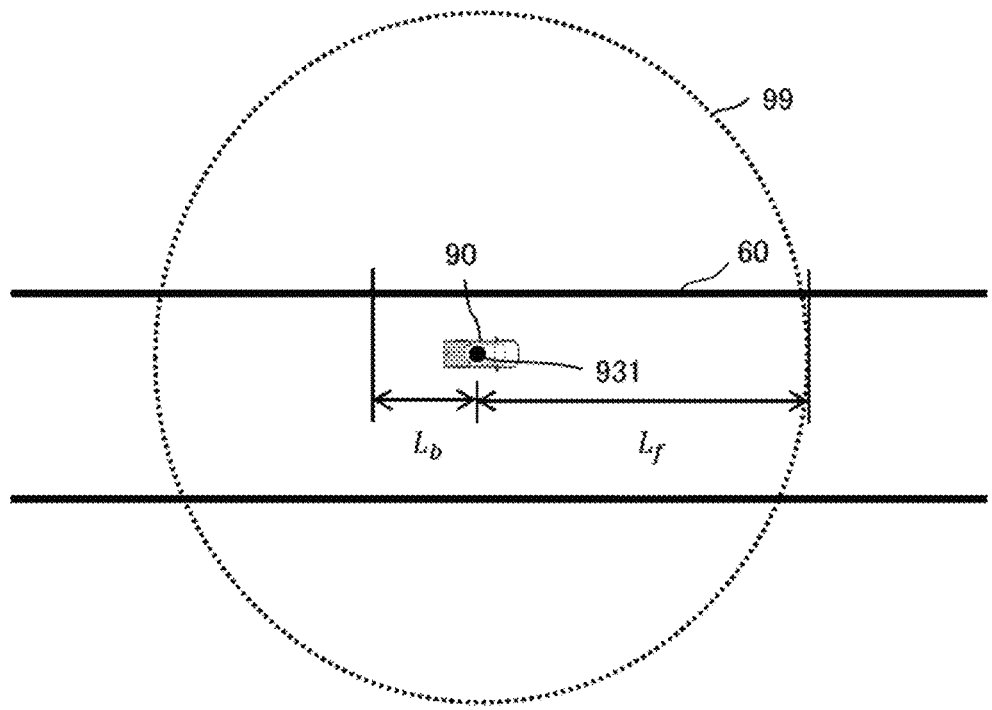
FIGS. 10A and 10B are diagrams for showing the setting method for the unmanned vehicle entry prohibited area in the second embodiment of the present invention.

Describing more particularly with reference to FIG. 10A, the unmanned vehicle entry prohibited area setting section 313 of the controller 31 sets, as an unmanned vehicle entry prohibited area 99, a circular area having, as a center, the position 931 of the escorting vehicle 90 obtained before the detection of the abnormal state and, as a radius, the maximum value of the front margin Lf and the rear margin Lb. For example, Lf is set such that Lf changes according to the speed of the escorting vehicle 90 (in other words, a braking distance) obtained before the detection of the abnormal state, that is, Lf increases as the vehicle speed of the escorting vehicle 90 increases. As a result, when the escorting vehicle 90 stops in accordance with the alarm for prompting the stop, the escorting vehicle 90 can be maintained inside the unmanned vehicle entry prohibited area 99.

The unmanned vehicle entry prohibited area setting section 313 of the controller 31 proceeds to step S512 when the escorting target of the escorting vehicle 90 is set in step S501. The unmanned vehicle entry prohibited area setting section 313 of the controller 31 determines whether or not the abnormal state of the position information on the escorting vehicle 90 has been detected by the abnormal state detection section 314 in step S512 as in step S509. The unmanned vehicle entry prohibited area setting section 313 of the controller 31 proceeds to step S503 of FIG. 6 when the abnormal state of the position information on the escorting vehicle 90 has not been detected. The following part is similar to that of the first embodiment, and hence a description is omitted.

The unmanned vehicle entry prohibited area setting section 313 of the controller 31 proceeds to step S513 and step S514 when the abnormal state of the position information on the escorting vehicle 90 has been detected in step S512. The inter-vehicle distance computation section 315 of the controller 31 computes the inter-vehicle distance between the escorting vehicle 90 and the escorted vehicle 50 on the basis of the position information on the escorting vehicle 90 and the position information on the escorted vehicle 50 that are obtained before the detection of the abnormal state in step S513. The unmanned vehicle entry prohibited area setting section 313 of the controller 31 sets the unmanned vehicle entry prohibited area based on the position information on the escorting vehicle 90 obtained before the detection of the abnormal state and the inter-vehicle distance computed by the inter-vehicle distance computation section 315, in step S514.

Figure 10B:
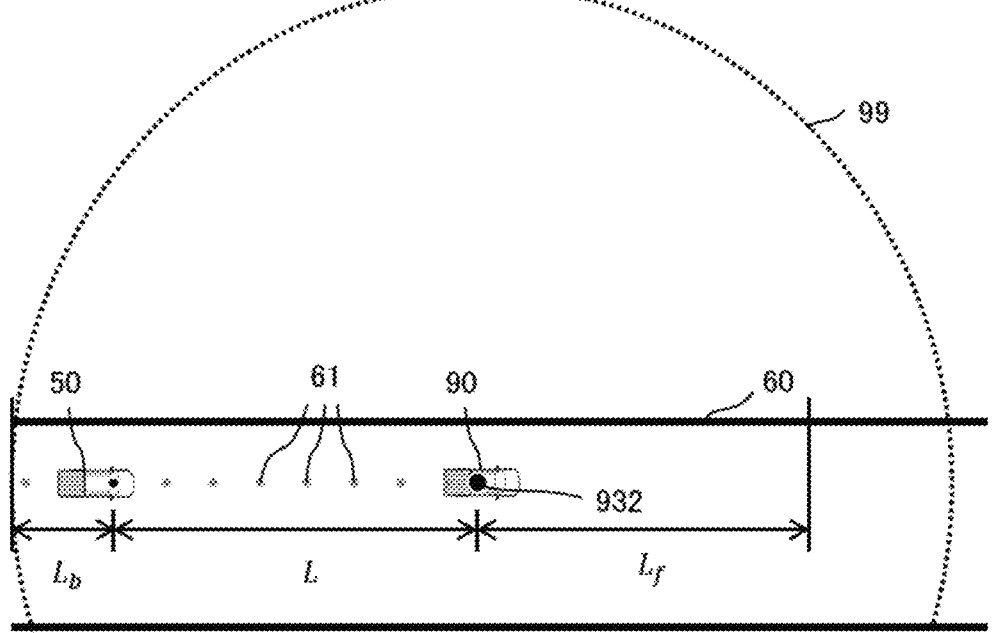

Describing more particularly with reference to FIG. 10B, the inter-vehicle distance computation section 315 of the controller 31 extracts the area setting target nodes 61 based on the map data stored in the map data storage section 323, the history of the position of the escorting vehicle 90 within a predetermined time in the past, and the inter-vehicle distance L computed by the inter-vehicle distance computation section 315. That is, for example, the unmanned vehicle entry prohibited area setting section 313 of the controller 31 extracts, as the area setting target nodes 61, nodes up to a rear end node having a distance which is from the position 931 of the escorting vehicle 90 obtained before the detection of the abnormal state and corresponds to the inter-vehicle distance L in the node point row of the map data existing in the vicinity of the history of each position of the escorting vehicle 90.

Then, the unmanned vehicle entry prohibited area setting section 313 of the controller 31 sets the front margin having the length Lf in front in the travel direction with the position 931 of the escorting vehicle 90 obtained before the detection of the abnormal state as reference coordinates and the rear margin having the length Lb in the rear in the travel direction with the rear end node of the area setting target nodes 61 as reference coordinates. Then, the unmanned vehicle entry prohibited area setting section 313 of the controller 31 sets, as the unmanned vehicle entry prohibited area 99, a circular area having, as the center, the position 931 of the escorting vehicle 90 obtained before the detection of the abnormal state and, as the radius, the maximum value of the front margin Lf and a sum of the inter-vehicle distance L and the rear margin Lb.

The unmanned vehicle entry prohibited area setting section 313 of the controller 31 transmits the command for the alarm for prompting the stop of the escorting vehicle 90 to the management controller 91 of the escorting vehicle 90 in Step S515. The alarm control section 913 of the management controller 91 of the escorting vehicle 90 outputs the command to the output device 94 when the alarm control section 913 of the management controller 91 of the escorting vehicle 90 receives the command for the alarm mentioned above, to thereby cause the output device 94 to output the alarm for prompting the stop. The alarm control section 913 of the management controller 91 of the escorting vehicle 90 outputs the command to the output device 94 also when the communication abnormality detection section 912 determines that the communication state between the escorting vehicle 90 and the control station 30 is abnormal, to thereby cause the output device 94 to output the alarm for prompting the stop. Note that, the alarm control section 913 of the management controller 91 of the escorting vehicle 90 may output the command to the output device 94, to thereby cause the output device 94 to output the alarm for prompting the stop not when the alarm control section 913 of the management controller 91 of the escorting vehicle 90 does not receive the command for the alarm mentioned above, but when the position precision information on the escorting vehicle 90 is lower than a predetermined level.

Moreover, the unmanned vehicle entry prohibited area setting section 313 of the controller 31 transmits a command for an alarm for prompting stop of the escorted vehicle 50 to the management controller 51 of the escorted vehicle 50 in Step S515. The alarm control section 513 of the management controller 51 of the escorted vehicle 50 outputs a command to the output device 54 when the alarm control section 513 of the management controller 51 of the escorted vehicle 50 receives the command for the alarm mentioned above, to thereby cause the output device 54 to output the alarm for prompting the stop.

The unmanned vehicle entry prohibited area setting section 313 of the controller 31 proceeds to step S508 when the processing in step S502, step S511, step S515, or the like is completed. The unmanned vehicle entry prohibited area setting section 313 of the controller 31 causes the control information storage section 322 to store, as the control information, information on the set entry prohibited area, and transmits the information on the set entry prohibited area to the management controller 91 of the escorting vehicle 90 in step S508. The management controller 91 of the escorting vehicle 90 displays the unmanned vehicle entry prohibited area on the screen of the output device 94 on the basis of the received information.

The same effects as those of the first embodiment are provided also in the vehicle management system 1 of the present embodiment configured as mentioned above. Moreover, in the vehicle management system 1 in the present embodiment, the controller 31 sets the unmanned vehicle entry prohibited area based on the position information on the escorting vehicle 90 and the inter-vehicle distance when the controller 31 detects the abnormal state of the position information on the escorting vehicle 90, the output device 94 of the escorting vehicle 90 and the output device 54 of the escorted vehicle 50 output the alarm for prompting the stop, and hence the collision between the escorting vehicle 90 or the escorted vehicle 50 and the unmanned vehicle 20 can be avoided.

DESCRIPTION OF REFERENCE CHARACTERS

1: Vehicle management system
20: Unmanned vehicle
21: Travel controller
23: Position sensor (first position sensor)
30: Control station
50: Escorted vehicle
51: Management controller
53: Position sensor (second position sensor)
54: Output device
90: Escorted vehicle
91: Management controller
93: Position sensor (third position sensor)
94: Output device
95: Setting device

The invention claimed is:

1. A vehicle management system configured such that a unmanned vehicle that is capable of autonomously traveling, an escorted vehicle that is a manned vehicle, an escorting vehicle that is a manned vehicle and precedes the escorted vehicle to escort the escorted vehicle, and a control station that controls the unmanned vehicle on a basis of position information on the escorting vehicle and position information on the escorted vehicle are capable of communicating with each other, wherein
the control station receives position information on the unmanned vehicle acquired by a first position sensor provided to the unmanned vehicle, and transmits a command to a travel controller that is provided to the unmanned vehicle and controls travel of the unmanned vehicle,
the control station receives position information and position precision information on the escorted vehicle acquired by a second position sensor provided to the escorted vehicle,
the control station receives information on the escorted vehicle set as an escorting target of the escorting vehicle by a setting device provided to the escorting vehicle and position information and position precision information on the escorting vehicle acquired by a third position sensor provided to the escorting vehicle and outputs a command to a management controller that controls an output device provided to the escorting vehicle and capable of outputting an alarm,
the control station includes a controller that sets an entry prohibited area for the unmanned vehicle on the basis of the position information on the escorting vehicle and the position information on the escorted vehicle and controls the unmanned vehicle such that the unmanned vehicle does not enter the entry prohibited area,
the controller is configured to
determine whether or not an abnormal state of the position information on the escorted vehicle has been detected on a basis of a communication state of and the position precision information on the escorted vehicle,
set the entry prohibited area of the unmanned vehicle on the basis of the position information on the escorting vehicle and the position information on the escorted vehicle when the abnormal state of the position information on the escorted vehicle has not been detected, and
compute, when the abnormal state of the position information on the escorted vehicle has been detected, an inter-vehicle distance between the escorting vehicle and the escorted vehicle on a basis of the position information on the escorting vehicle and the position information on the escorted vehicle that are obtained before the detection of the abnormal state, to thereby set the entry prohibited area of the unmanned vehicle on a basis of the current position information on the escorting vehicle and the inter-vehicle distance, and
the output device outputs an alarm that prompts maintenance of the inter-vehicle distance between the escorting vehicle and the escorted vehicle when the abnormal state of the position information on the escorted vehicle has been detected.

2. The vehicle management system according to claim 1, wherein
the escorted vehicle includes a management controller and an output device that is controlled by the management controller of the escorted vehicle such that the output device is capable of outputting an alarm, and
the output device of the escorted vehicle outputs an alarm that prompts maintenance of the inter-vehicle distance between the escorting vehicle and the escorted vehicle when the abnormal state of the position information on the escorted vehicle has been detected.

3. The vehicle management system according to claim 1, wherein the controller is configured to
- determine whether or not an abnormal state of the position information on the escorting vehicle has been detected on a basis of a communication state of and the position precision information on the escorting vehicle, and
- compute, when the abnormal state of the position information on the escorting vehicle has been detected, an inter-vehicle distance between the escorting vehicle and the escorted vehicle on the basis of the position information on the escorting vehicle and the position information on the escorted vehicle that are obtained before the detection of the abnormal state, to thereby set the entry prohibited area of the unmanned vehicle on a basis of the position information on the escorting vehicle obtained before the detection of the abnormal state and the inter-vehicle distance, and the output device of the escorting vehicle outputs an alarm that prompts stop of the escorting vehicle when the abnormal state of the position information on the escorting vehicle has been detected.

4. The vehicle management system according to claim 3, wherein the escorted vehicle includes a management controller and an output device that is controlled by the management controller of the escorted vehicle such that the output device is capable of outputting an alarm, and the output device of the escorted vehicle outputs an alarm that prompts stop of the escorted vehicle when the abnormal state of the position information on the escorting vehicle has been detected.

* * * * *